United States Patent [19]

Kwak et al.

[11] Patent Number: 5,790,208
[45] Date of Patent: Aug. 4, 1998

[54] APPARATUS FOR ESTIMATING FRAME-TO-FRAME AND FIELD-TO-FIELD MOTIONS

[75] Inventors: Jin Suk Kwak; Jin Woong Kim; Do Nyon Kim; Kang Whan Lee; Dong Hyun Kwon, all of Daejeon, Rep. of Korea

[73] Assignee: Electronics and Telecommunications Research Intstitute, Daejeon, Rep. of Korea

[21] Appl. No.: 956,762

[22] Filed: Oct. 22, 1997

Related U.S. Application Data

[63] Continuation of Ser. No. 710,258, Sep. 13, 1996, abandoned.

[30] Foreign Application Priority Data

Dec. 12, 1995 [KR] Rep. of Korea ............... 1995-48899

[51] Int. Cl.$^6$ ............................................... H04N 7/50
[52] U.S. Cl. .............................. 348/697; 348/415; 348/416
[58] Field of Search ............................ 348/400, 401, 348/402, 409, 411, 412, 413, 415, 416, 420, 699; H04N 7/50

[56] References Cited

U.S. PATENT DOCUMENTS

| | | | |
|---|---|---|---|
| 5,142,361 | 8/1992 | Tayama et al. | 358/105 |
| 5,175,618 | 12/1992 | Ueda et al. | 348/699 |
| 5,200,820 | 4/1993 | Gharavi | 358/105 |
| 5,212,548 | 5/1993 | De Haan et al. | 358/105 |
| 5,317,397 | 5/1994 | Odaka et al. | 348/416 |
| 5,365,280 | 11/1994 | De Haan et al. | 348/699 |
| 5,386,248 | 1/1995 | De Haan et al. | 348/699 |
| 5,400,087 | 3/1995 | Uramoto et al. | 348/699 |
| 5,539,466 | 7/1996 | Igarashi et al. | 348/412 |
| 5,568,203 | 10/1996 | Lee | 348/699 |
| 5,579,058 | 11/1996 | Lee | 348/699 |
| 5,579,059 | 11/1996 | Jang et al. | 348/699 |

FOREIGN PATENT DOCUMENTS

0592128  9/1993  European Pat. Off. .

OTHER PUBLICATIONS

"A Family of LSI Designs for the Motion Compensation Block-Matching Algorithm," Kun-Min Yang, Ming-Ting Sun and Lancelot Wu, IEEE Transaction on Circuits and Systems, vol. 36, No. 10, Oct., 1989.

"Array Architectures for Block Matching Algorithms," Thomas Komarek and Peter Pirsch, IEEE Transactions on Circuits and Systems, vol. 36, No. 10, Oct.,1989.

"Zero Waiting-Cycle Hieraronical Block Matching Algorithm and its Array Achitectures," Bor-Min Wang, Jui-Cheng Yen and Shyang Chang, IEEE Transactions on Circuits and Systems for Video Technology, vol. 3, No. 1, Feb., 1994.

*Primary Examiner*—Tommy P. Chin
*Assistant Examiner*—Luanne P. Din
*Attorney, Agent, or Firm*—Nixon & Vanderhye P.C.

[57] ABSTRACT

The present invention relates to an apparatus for simultaneously estimating a set of frame-to-frame motions between two frames and a set of field-to-field motions between two fields. The apparatus for simultaneously estimating both a set of frame-to-frame motions and a set of field-to-field motions, comprises: a first delay unit 1 for delaying a set of search area data of a first frame of the frames; a selection unit 3 for selecting a set of current reference data of a second frame of the frames or a set of previous reference data of the second frame; a motion estimation unit 4 for calculating a mean absolute difference between an output of a selection unit 3 and an output of the first delay unit 1; a second delay unit 2 for delaying a feedback reference data from the motion estimation unit 4; and a comparator 5 for receiving an output from the a motion estimation unit 4 and employing a mean absolute difference for each of the fields to produce a mean absolute difference, a motion vector and a prediction direction for each of the fields, and to produce a mean absolute difference and a motion vector for each of sets of the reference data contained in the second frame.

4 Claims, 5 Drawing Sheets

*Fig. 1A*

| c(0,0) | c(0,1) | .... | c(0,15) |
|---|---|---|---|
| c(2,0) | c(2,1) | .... | c(2,15) |
| .... | .... | .... | .... |
| c(14,0) | c(14,1) | .... | c(14,15) |

8x16 REFERENCE BLOCK OF TOP FIELD

*Fig. 1B*

| c(1,0) | c(1,1) | .... | c(1,15) |
|---|---|---|---|
| c(3,0) | c(3,1) | .... | c(3,15) |
| .... | .... | .... | .... |
| c(15,0) | c(15,1) | .... | c(15,15) |

8x16 REFERENCE BLOCK OF BOTTOM FIELD

*Fig. 1C*

| s(0,0) | s(0,1) | s(0,2) | .... | s(0,31) |
|---|---|---|---|---|
| s(2,0) | s(2,1) | s(2,2) | .... | s(2,31) |
| s(4,0) | s(4,1) | s(4,2) | .... | s(4,31) |
| .... | .... | .... | .... | .... |
| s(30,0) | s(30,1) | s(30,2) | .... | s(30,31) |

16x32 SEARCH REGION OF TOP FIELD

*Fig. 1D*

| s(1,0) | s(1,1) | s(1,2) | .... | s(1,31) |
|---|---|---|---|---|
| s(3,0) | s(3,1) | s(3,2) | .... | s(3,31) |
| s(5,0) | s(5,1) | s(5,2) | .... | s(5,31) |
| .... | .... | .... | .... | .... |
| s(31,0) | s(31,1) | s(31,2) | .... | s(31,31) |

16x32 SEARCH REGION OF BOTTOM FIELD

Fig. 5

| TIME | Data Sequences | | | PE(0,0) | PE(1,0) | ... | PE(15,0) | MAD | |
|---|---|---|---|---|---|---|---|---|---|
| T | SE/DSE | SD/DSD | C/DC | | | | | MAD0(v,0) | MAD1(v,0) |
| | | | | | | | | MAD0(v,0/8) | MAD1(v,0/8) |
| 0 | S(0,0) | | C(0,0) | C(0,0)-S(0,0) | | | | | |
| 1 | S(1,0) | | C(1,0) | C(1,0)-S(1,0) | C(0,0)-S(1,0) | | | | |
| 2 | S(2,0) | | C(2,0) | C(2,0)-S(2,0) | C(1,0)-S(2,0) | | | | |
| ⋮ | | | ⋮ | ⋮ | ⋮ | | C(0,0)-S(15,0) | | |
| 15 | S(15,0) | | C(15,0) | C(15,0)-S(15,0) | C(14,0)-S(15,0) | | C(1,0)-S(16,0) | | |
| 16 | S(16,0) | S(0,1) | C(0,1) | C(0,1)-S(0,1) | C(15,0)-S(16,0) | | C(2,0)-S(17,0) | | |
| 17 | S(17,0) | S(1,1) | C(1,1) | C(1,1)-S(1,1) | C(0,1)-S(1,1) | | ⋮ | | |
| ⋮ | | | ⋮ | ⋮ | ⋮ | | C(1,14)-S(16,14) | | |
| 240 | S(16,14) | S(0,15) | C(0,15) | C(0,15)-S(0,15) | C(15,14)-S(16,14) | | ⋮ | | |
| ⋮ | | | ⋮ | ⋮ | ⋮ | | C(15,14)-S(30,14) | MAD0(0,0) | |
| 254 | S(30,14) | S(14,15) | C(14,15) | C(14,15)-S(14,15) | C(13,15)-S(14,15) | | C(0,15)-S(15,15) | MAD0(1,0) | MAD1(0,0) |
| 255 | S(31,14) | S(15,15) | C(15,15) | C(15,15)-S(15,15) | C(14,15)-S(15,15) | | C(1,15)-S(16,15) | MAD0(2,0) | MAD1(1,0) |
| 256 | S(0,8) | S(16,15) | C(0,0) | C(0,0),-S(0,8) | C(15,15)-S(16,15) | | ⋮ | ⋮ | ⋮ |
| ⋮ | | | ⋮ | ⋮ | ⋮ | | C(14,15)-S(29,15) | MAD0(15,0) | MAD1(14,0) |
| 269 | S(13,8) | S(29,15) | C(13,0) | C(13,0),-S(13,8) | C(12,0)-S(13,8) | | C(15,15)-S(30,15) | | MAD1(15,0) |
| 270 | S(14,8) | S(30,15) | C(14,0) | C(14,0),-S(14,8) | C(13,0)-S(14,8) | | C(0,0)-S(15,8) | | |
| 271 | S(15,8) | S(31,15) | C(15,0) | C(15,0),-S(15,8) | C(14,0)-S(15,8) | | C(1,0)-S(16,8) | | |
| 272 | S(16,8) | S(0,9) | C(0,1) | C(0,1),-S(0,9) | C(15,0)-S(16,8) | | C(2,0)-S(17,8) | | |
| 273 | S(17,8) | S(1,9) | C(1,1) | C(1,1),-S(1,9) | C(0,1)-S(1,9) | | ⋮ | | |
| ⋮ | | | ⋮ | ⋮ | ⋮ | | C(1,14)-S(16,22) | | |
| 496 | S(16,22) | S(0,23) | C(0,15) | C(0,15)-S(0,23) | C(15,14)-S(16,22) | | ⋮ | | |
| ⋮ | | | ⋮ | ⋮ | ⋮ | | C(15,14)-S(30,22) | MAD0(0,8) | |
| 510 | S(30,22) | S(14,23) | C(14,15) | C(14,15)-S(14,23) | C(13,15)-S(14,23) | | C(0,15)-S(15,23) | MAD0(1,8) | MAD1(0,8) |
| 511 | S(31,22) | S(15,23) | C(15,15) | C(15,15)-S(15,23) | C(14,15)-S(15,23) | | C(1,15)-S(16,23) | MAD0(2,8) | MAD1(1,8) |
| 512 | · | S(16,23) | · | · | C(15,15)-S(16,23) | | ⋮ | ⋮ | ⋮ |
| ⋮ | ⋮ | ⋮ | ⋮ | ⋮ | | | C(14,15)-S(29,23) | MAD0(15,8) | MAD1(14,8) |
| 525 | · | S(29,23) | · | · | · | | C(15,15)-S(30,23) | | MAD1(15,8) |
| 523 | · | S(30,23) | · | · | · | | | | |
| 524 | · | S(31,23) | · | · | · | | | | |

APPARATUS FOR ESTIMATING FRAME-TO-FRAME AND FIELD-TO-FIELD MOTIONS

This is a continuation of application Ser. No. 08/710,258, filed Sep. 13, 1996, now abandoned.

BACKGROUND OF THE INVENTION

1. Field of the Invention

The present invention relates to an apparatus for simultaneously estimating a set of frame-to-frame motions between frames and a set of field-to-field motions between fields.

2. Description of the Prior Art

Since a conventional motion estimation apparatus only detects a set of frame-to-frame motions between two frames, in order to estimate both a set of field-to-field motions and a set of frame-to-frame motions between two frames by using the conventional motion estimator, two or more separated motion estimators should be employed to estimate each of the sets of motions.

SUMMARY OF THE INVENTION

Therefore, it is a primary object of the present invention to provide an apparatus for simultaneously estimating a set of frame-to-frame motions and a set of field-to-field motions.

In accordance with the present invention, the above and other objects can be accomplished by an apparatus for simultaneously estimating both a set of frame-to-frame motions and a set of field-to-field motions between two frames, wherein each of the frames consists of a top-field and a bottom-field, which comprises: first delay means for delaying a set of search area data of a first frame of the two frames; means for selecting a set of current reference data of a second frame of the two frames or a set of previous reference data of the second frame, the previous reference data being a motion estimated and delayed data; motion estimation means for calculating a mean absolute difference between an output of said means for selecting and an output of said first delay means; second delay means for delaying a feedback reference data from the motion estimation means; and comparing means for receiving an output from the motion estimation means and employing a mean absolute difference for each of the fields to produce a mean absolute difference, a motion vector and a prediction direction for each of the fields and to produce a mean absolute difference and a motion vector for each of sets of the reference data contained in the second frame.

BRIEF DESCRIPTION OF THE DRAWINGS

The above and other objects, features and advantages of the present invention will be more clearly understood from the following detailed description taken in conjunction with the accompanying drawings, in which:

FIG. 1 shows a search region data structure and a reference block data structure, respectively;

FIG. 5 is an exemplary data flow chart of the motion estimation apparatus of the FIG. 2.

DETAILED DESCRIPTION OF THE PREFERRED EMBODIMENTS

Referring to FIG. 1, there are shown data structures of a search area and a reference block, respectively. As shown in FIG. 1, each of the data structures includes a top field and a bottom field.

When a frame-to-frame motion is estimated for a reference block, a mean absolute difference MAD(u,v) between the reference block and a candidate block, can be expressed by sum of MAD0(u,v) for the top field block of the reference block and MAD1(u,v) for the bottom field block of the reference block, as follows:

$$MAD(u,v) = \frac{1}{2}(MAD0(u,v) + MAD1(u,v)) \qquad \text{Eq. (1)}$$

$$MAD0(u,v) = \frac{1}{8 \times 16} \sum_{i=0}^{7} \sum_{j=0}^{15} |s(2i + u, j + v) - c(2i,j)| \qquad \text{Eq. (2)}$$

$$MAD1(U,V) = \frac{1}{8 \times 16} \sum_{i=0}^{7} \sum_{j=0}^{15} |s(2i + 1 + u, j + v) - c(2i + 1, j)| \qquad \text{Eq. (3)}$$

Therefore, the estimation of frame-to-frame motions can be accomplished by using the result of the summation of MAD0(u,v) and MAD1(u,v), each of which are made during the estimation of field-to-field motions. At this time, a candidate field, a reference field and the direction of the prediction used at the field-to-field motion estimation according to the value u of each position (u,v) of the candidate block is as follows:

| u | MAD | FIELD OF CANDIDATE BLOCK | FIELD OF REFERENCE BLOCK | PRE-DICTION DIRECTION |
|---|---|---|---|---|
| EVEN NUMBER | MAD0 (u, v) | Top | Top | TT |
|  | MAD1 (u, v) | Bottom | Bottom | BB |
| ODD NUMBER | MAD0 (u, v) | Bottom | Top | TB |
|  | MAD1 (u, v) | Top | Bottom | BT | wherein, T of TB represents the top field of the reference block and B of TB shows the bottom field of the reference block.

Figure 2:
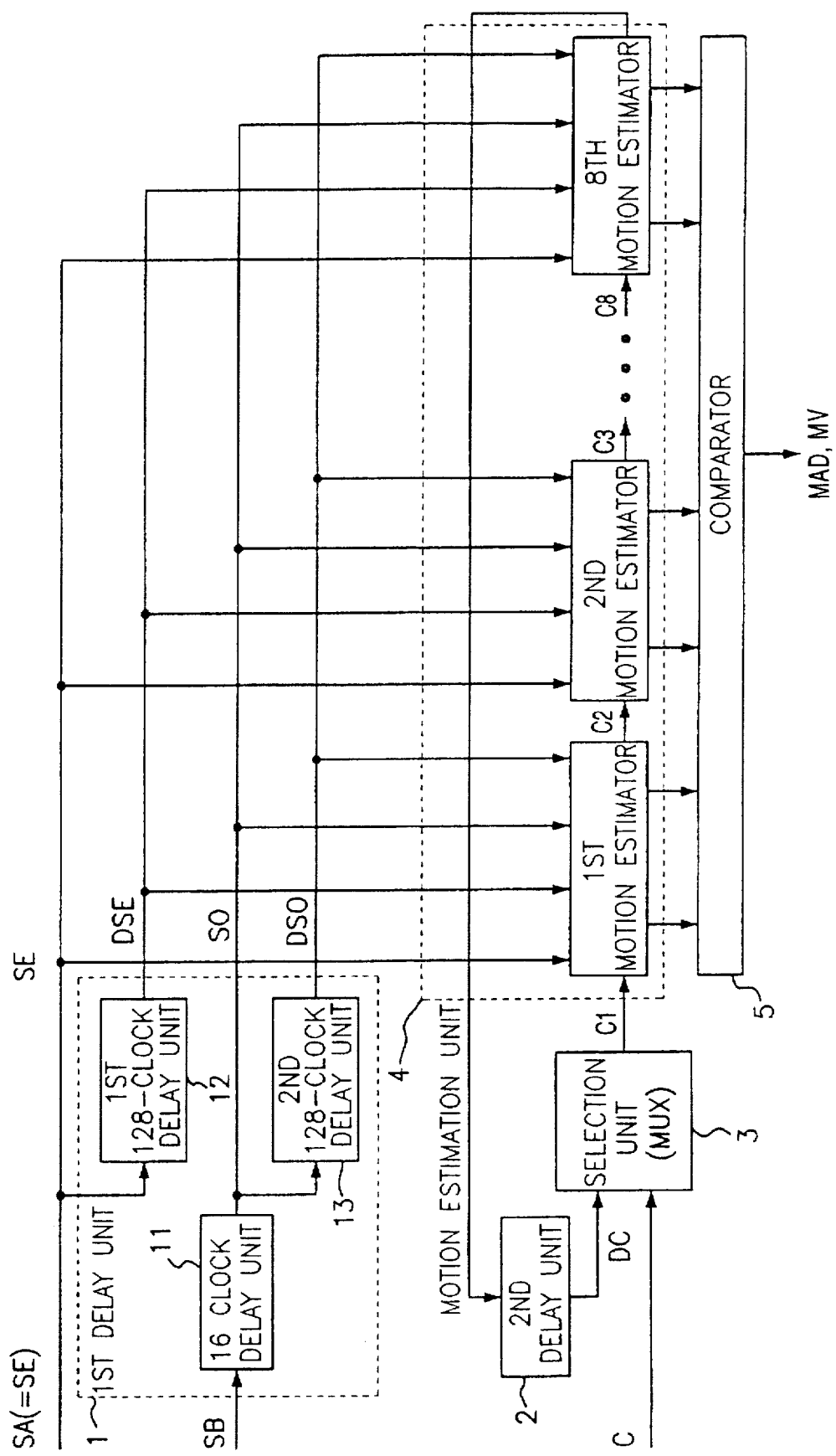
FIG. 2 illustrates a block diagram of a motion estimation apparatus in accordance with the present invention.

Referring to FIG. 2, there is shown a block diagram of a motion estimation apparatus in accordance with the present invention. In this drawing, the reference numeral 1 designates a first delay unit, the reference numeral 2 represents a second delay unit, the reference numeral 3 shows a selection unit, the reference numeral 4 indicates a motion estimation unit and the reference numeral 5 shows a comparator.

The first delay unit 1 comprises a sixteen-clock delay element 11 for delaying the data of the odd column of the search region by sixteen clocks, a first 128 clock delay unit 12 for delaying the data of the even column of the search region by 128 clocks and a second 128 clock delay unit 13 for delaying the output of the sixteen-clock delay unit 11 by the 128 clocks. The selection unit 3 includes a multiplexer MUX for selecting the input data of the reference block data or 128-clock delayed data which are provided from the second delay unit 2, wherein the input data of the second delay unit 2 is the output data of 8th motion estimator in the motion estimation unit 4.

The important elements of the inventive motion estimation apparatus are the motion estimator for performing the vertical direction motion estimation and a comparator for comparing the mean absolute difference. The motion estimation unit 4 having eight number of the motion estimators for the vertical motion estimation calculates the mean absolute differences for the reference block of the top field and the reference block of the bottom field to provide them with the comparator 5. The comparator 5 is responsive to the mean absolute difference for each of the fields to produce the minimum value of the mean absolute differences. i.e., min{MAD0(u,v)}, min{MAD1(u,v)}, motion vectors, i.e., MV0(u,v), MV1(u,v) and prediction directions for the top and the bottom fields, and also produce the minimum value of the mean absolute differences, i.e., min{MAD0(u,v)+MAD1(u,v) } and the motion vector MV(u,v) for the entire reference blocks. The detailed description of the inventive motion estimation apparatus is described below. As shown in FIG. 2, SA is the input data of an odd column of the search region, SB represents the input data of an even column of the search region and C is the input data of the reference block. The odd column data SB of the search region is inputted to in the 16-clock delay unit 11 wherein the inputted data is delayed by 16 clocks. The delayed odd column data SO is provided to the motion estimation unit 4 and the second 128-clock delay unit 13, respectively. The second 128-clock delay unit 13 delays the previously delayed odd column data SO by 128 clocks to produce the 128-clock delayed data DSO which is inputted to the motion estimation unit 4. On the other hand, the even column data SA (or BE) of the search region is inputted to the motion estimation unit 4 and the first 128-clock delay unit 12 of the first delay unit 1, respectively. The first 128-clock delay unit 12 delays the inputted data by 128 clocks to produce the delayed data DSE which is inputted to the motion estimation unit 4. The second delay unit 2 receives feedback data from the motion estimation unit 4 to delay the feedback data by 128 clocks to produce the delayed data DC which is inputted to the selection unit 3. The reference block data C is also inputted to the selection unit 3 wherein one is selected out of the two the delayed data DC and the reference data C corresponding to the a selection signal. The selected signal C1 from the selection unit 3 is inputted to the first motion estimator in the motion estimation unit 4 for the vertical direction estimation. The first motion estimator performs the motion estimation using the inputted reference block data C1, and produces the delayed reference block data C2 to a second motion estimator. The second motion estimator produces a delayed reference block data C3 to the next motion estimator and so on. Thereafter, the eighth motion estimator receives a delayed reference block data C8 from a seventh motion estimator. At this time, the reference block data from the eighth motion estimator is inputted to the second delay unit 2 wherein the inputted data is delayed by 128 clocks. When the 128-clock delayed data is supplied through the selection unit 3 to the first motion estimator, the first motion estimator stops the first motion estimation and then starts the next motion estimation.

According to the above described process, the motion estimation unit 4 calculates each of the mean absolute differences for the reference block of the top field and the reference block of the bottom field at each of the candidate block positions. The calculated mean absolute differences are provided to the comparator 5, which employs a mean absolute difference for each of the fields to produce a minimum mean absolute difference, MAD a motion vector MV and a prediction direction PRED for the reference block of the top and the reference block of the bottom field and then to produce a minimum mean absolute difference and a motion vector for the entire reference block.

Figure 3:
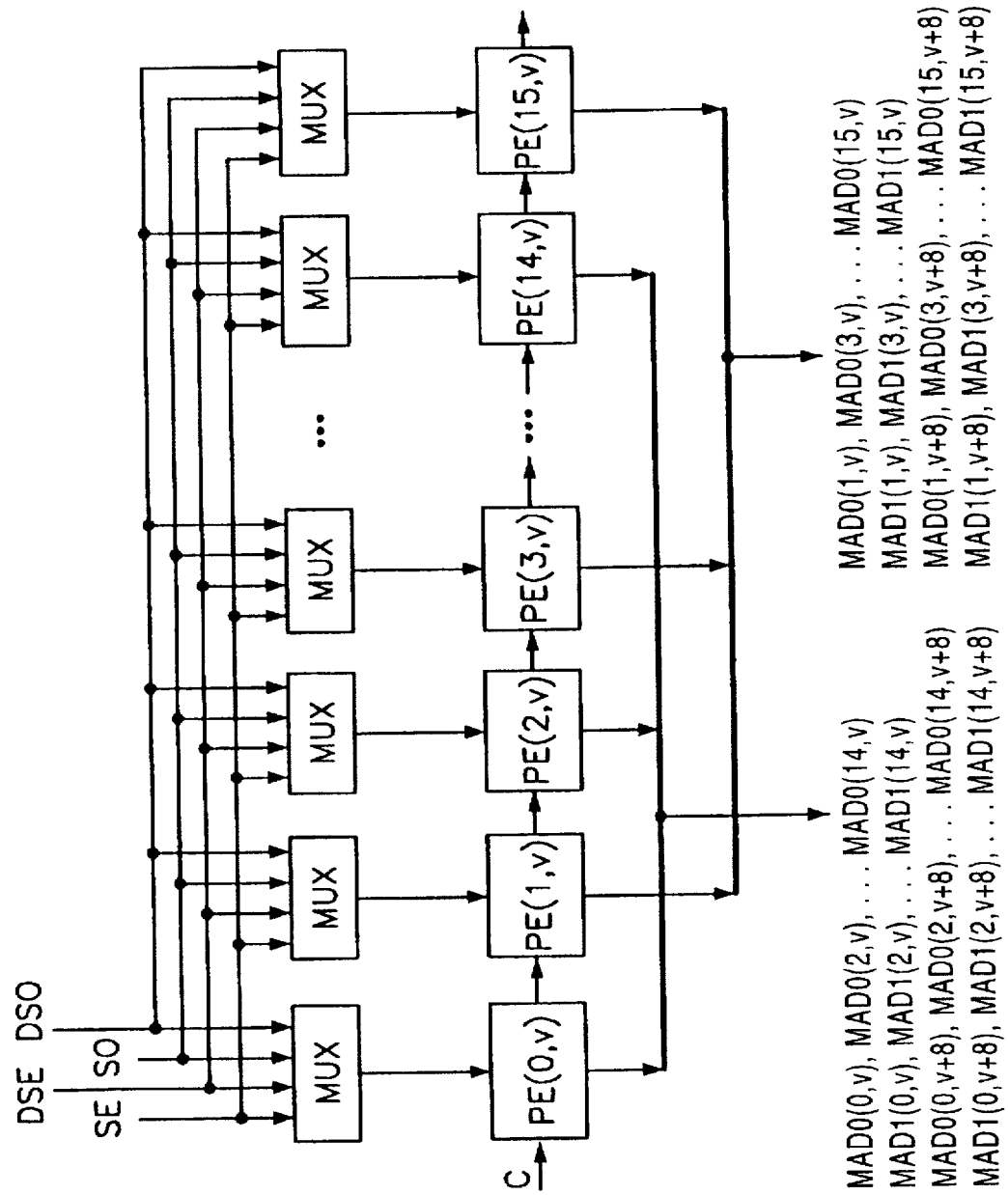
FIG. 3 depicts a motion estimator of the motion estimation apparatus of FIG. 2.

Referring to FIG. 3, there is shown a motion estimator for the vertical direction. The motion estimator has 16 of muliplexers MUXs and 16 of unit operators PEs. Each of the multiplexers receives SE, DSE, SO and DSO from the first delay unit 1 and selectively produces one of them according to a selection signal. Each of the unit operators PEs receive each corresponding output of the multiplexers and the reference block data from the selection unit 3 to produce an accumulated mean absolute difference.

Figure 4:
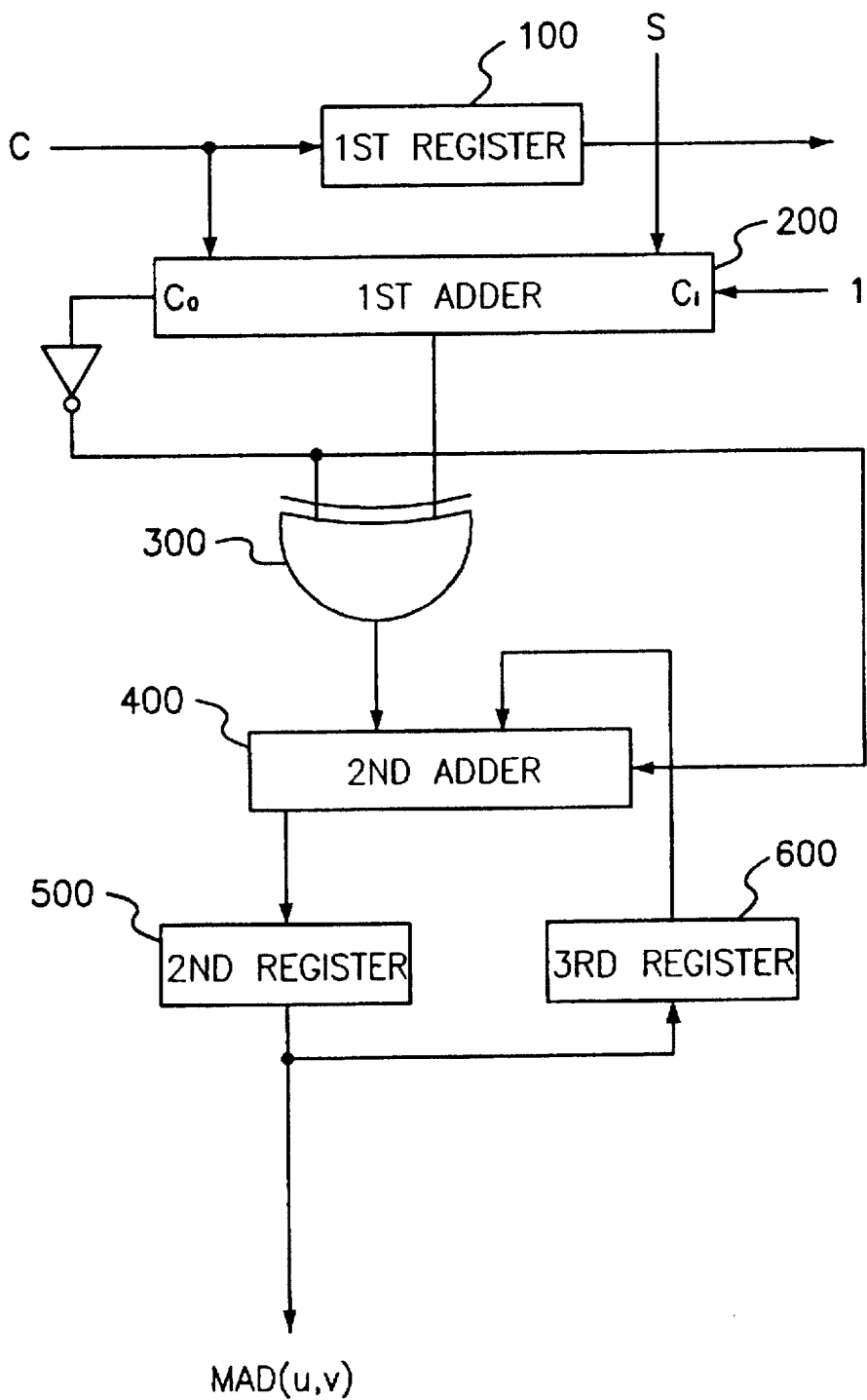
FIG. 4 describes a block diagram of a unit operator PE of the motion estimator of FIG. 3.

Referring to FIG. 4, there is shown a detailed block diagram of a unit operator PE(u,v) (wherein, u=1, . . . , 15, v=0, 1, 2, . . . 7).

The unit operator includes a first register 100 for delaying the reference block data by one clock, a first adder 200 for adding the reference block data to the selected search region data; an exclusive OR-gate 300 for performing the exclusive OR operation with the inputted data, i.e., an inverted MSB from the first adder 200 and 8-bits of remaining data therefrom; a second adder 400 for summing the output from the exclusive OR-gate 300, the inverted MSB and a previously calculated MAD(u-1, v-1) data from register 6; a second register 500 for storing the output from the second adder 400; and a third register 600 for delaying the output from the second register 500 by one clock to send the delayed data to the second adder 400.

As shown in the FIG. 3, SO, DSO, SE and DSE represent the search region data or the 128-clock delayed data, respectively. C is the reference block data produced from a previous motion estimator. While the motion is estimated, the motion estimator employs the 16 unit operators to calculate the mean absolute difference for 32 number of row position and (v+8)th column out of 16×16 number of candidate positions, wherein v ranges from 0 to 7. At this time, the unit operator PE(u,v) calculates the mean absolute differences for the reference block of the top field and the reference block of the bottom field at uth row of vth column, and then stores the results and sends them to the second register or the third register, respectively.

Referring to FIG. 5, there is shown an exemplary data flow chart of the inventive motion estimation apparatus. According to each of clock cycles in the first left-hand column, there are shown a number of data sequences, i.e., C, SO, DSO, SE, DSE of the reference block data C(i,j) and S(k,l) of the search region data.

The unit operator PE(u,0)(u=0, 1, . . . , 15) shown in the first row, represents the operation of each of 16 PEs of FIG. 3, and the following row shows each processing step of the PE(u,0). In the right-hand columns, there are illustrated MAD0(u,0) and MAD1(u,0), which are calculated in forward and backward for the reference blocks of the top and the bottom field at each of the candidate block positions, respectively.

The PE(0,0) in the motion estimator produces the mean absolute difference for each of the fields as follows.

At Time=0T, S(0,0) and C(0,0) are inputted to PE(0,0) and then PE(0,0) calculates the absolute difference |c(0,0)−s(0, 0)|. That is the absolute difference for the first pixel of the MAD0(0,0) having the prediction direction TT.

At Time=1T, PE(0,0) calculates |c(1,0)−s(1,0)| which is the absolute difference for the first pixel of MAD1(0,0) having the prediction direction BB.

At Time=2T, PE(0,0) calculates |c(2,0)−s(2,0)| which is the absolute difference for the second pixel of MAD0(0,0) having the prediction direction TT. This absolute difference is then added to the absolute difference of Time=0T.

Through the above described process, PE(0,0) calculates the absolute difference for each of the pixels of MAD0(0,0) and MAD1(0,0) having the prediction direction TT or BB from Time=0T to Time=255T.

At Time=(16xj+i)T, wherein i,j ranges from 0 to 15, PE(0,0) calculates |c(i,j)−s(i,j)| and then determines whether the i is an even or odd number. In case where i is even, the accumulation is performed for the prediction direction TT, and otherwise the accumulation is performed for the prediction BB. Therefore, PE(0,0) produces MAD(0,0) having the prediction direction TT at Time=254T and produces MAD1(0,0) having the prediction direction BB at Time= 255T. And then, from Time=256T to Time=511T, PE(0,0) calculates the mean absolute differences for the two fields at each of the candidate block positions as the above described method. At this time, the search region data delayed 128 clocks is provided. And the reference block data from the motion estimator is inputted PE(0,0) again.

C(i,j) used in PE(0,0) is delayed by one clock through the first register 100 and then inputted to the unit operator PE(1,0). Therefore, the motion estimation of the PE(1,0) starts at Time=1T. At this time, at Time=(16xj+i)T, wherein i,j ranges from 0 to 15, PE(1,0) calculates |c(i+1,j)−s(i+1,j)| and then determines whether i is even or odd number. In case i is even, the accumulation is performed for the prediction direction TB, and otherwise the accumulation is performed for the prediction BT. Therefore, MAD0(1,0) produces MAD0(1,0) which has the prediction direction TB at Time= 255T and produces MAD(1,0) which has the prediction direction BT at Time=256T.

Thereafter, from Time=257T to Time=512T, PE(1,0) calculates the mean absolute differences for the two fields at each of the candidate block positions as the above described method. At this time, the search region data delayed 128 clocks is provided to PE(0,0). In similar manner, the other PEs(u,0), wherein u ranges from 2 to 15, from Time=uT to Time=(511+u)T, PE(0,0) calculates the mean absolute differences for the two fields at candidate block positions (u,0) and (u,8), and then determines whether u is even or odd number. In case u is even, PE(u,0) calculates MAD0(u,0) or MAD1(u,0) having the prediction direction TT or BB, respectively. And, in case u is odd, PE(u,0) calculates MAD0(u,0) or MAD1(u,0) having the prediction direction TB or BT.

The 8 motion estimators calculate the mean absolute differences for 32 row positions of v and (v+8)th column out of 16×16 number of candidate positions. At this time, the reference block data which is needed for the motion estimation of the motion estimator is delayed by (16xv)T through the first to the seventh motion estimators, and then the delayed reference block data is inputted to the eighth motion estimator. Therefore, the eighth motion estimator starts the motion estimation for producing MAD0(u,v) and MAD1(u,v) from Time(16xv)T, as shown in the first motion estimator. And then, from time(512+16xv)T, the motion is estimated for a new reference block.

As apparent from the above description, the present invention provides an apparatus for simultaneously estimating a set of frame-to-frame motions and a set of field-to-field motions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for simultaneously estimating both a set of frame-to-frame motions between two frames and field-to-field motions between two fields by using only one motion estimation unit, wherein each of the two frames consists of a top-field and a bottom-field, which apparatus comprises:

first delay means for delaying a set of search area data of a first frame of the two frames;

selection means for selecting a set of current reference data of a second frame of the two frames or a set of previous reference data of the second frame, the previous reference data being a motion estimated and delayed data;

motion estimation unit for calculating both a set of frame-to-frame mean absolute differences and field-to-field unit absolute a differences between outputs of said selection means and outputs of said first delay means wherein each element of the one motion estimation unit is used for both frame to frame and field to field motion estimation;

second delay means for delaying a feedback reference data from the motion estimation unit and inputting the delayed feedback reference data to the selection unit; and comparing unit for receiving an output from the motion estimation means and employing a mean absolute difference for each of the fields to produce a mean absolute difference, a motion vector and a prediction direction for each of the fields and to produce a mean absolute difference and a motion vector for each of sets of the reference data contained in the second frame.

2. The apparatus in accordance with claim 1, wherein the motion estimation means includes:

first register means for delaying the reference block data by one clock;

first adding means for adding the reference block data and the selected search region data;

an exclusive logic-OR gate for receiving 9 bits from the first adding means to process the exclusive logic -OR between an inverted MSB of the 9 bits and the remaining 8-bits;

second adding means adding an inverted MSB from the first adding means and the output from the exclusive logic-OR gate and the output from a third register means storing previously calculated data;

second register means storing an output from the second adding means; and said third register means being disposed for delaying the output from the second register means by one clock.

3. A method for simultaneously estimating both a set of frame-to-frame motions between two frames and field-to-field motions between two fields by using only one motion estimation unit, wherein each of the two frames consists of a top-field and a bottom-field, which method comprises:

(a) delaying a set of search area data of a first frame of the two frames;

(b) selecting a set of current reference data of a second frame of the two frames or a set of previous reference data of the second frame, the previous reference data being a motion estimated and delayed data;

(c) calculating both a set of frame-to-frame mean absolute differences and field-to-field mean absolute differences between outputs of said selection step (b) and an output of said delay step (a);

(d) delaying a feedback reference data from the calculating step and inputting the delayed feedback reference data to the selection step; and (e) receiving an output from the calculating step and employing a mean absolute difference for each of the fields to produce a mean absolute difference, a motion vector and a prediction direction for each of the fields and to produce a mean absolute difference and a motion vector for each of sets of the reference data contained in the second frame.

4. A method as in claim 3, wherein the calculating step (c) includes:

(c1) delaying the reference block data by one clock;

(c2) adding the reference block data and the selected search region data;

(c3) receiving 9 bits from the adding step (c2) to process the exclusive logic-OR between an inverted MSB of the 9-bits and the remaining 8-bits;

(c4) adding an inverted MSB from the adding step (c2) and the output from the exclusive logic-OR step and the output from a third register storing previously calculated data;

(c5) storing an output from the adding step (c4); and (c6) delaying the output from the storing step by one clock to produce the previously calculated data.

* * * * *